(12) United States Patent
Wappler et al.

(10) Patent No.: US 11,371,851 B2
(45) Date of Patent: Jun. 28, 2022

(54) METHOD AND SYSTEM FOR DETERMINING LANDMARKS IN AN ENVIRONMENT OF A VEHICLE

(71) Applicant: Volkswagen Aktiengesellschaft, Wolfsburg (DE)

(72) Inventors: Stefan Wappler, Berlin (DE); Philipp Hüger, Rühen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 35 days.

(21) Appl. No.: 16/724,468

(22) Filed: Dec. 23, 2019

(65) Prior Publication Data
US 2020/0200545 A1 Jun. 25, 2020

(30) Foreign Application Priority Data
Dec. 21, 2018 (DE) ...................... 10 2018 133 441.9

(51) Int. Cl.
*G06K 9/62* (2022.01)
*G01C 21/30* (2006.01)
(Continued)

(52) U.S. Cl.
CPC ........... *G01C 21/30* (2013.01); *G06K 9/6256* (2013.01); *G06V 20/10* (2022.01); *G06V 20/58* (2022.01); *G06V 2201/08* (2022.01)

(58) Field of Classification Search
CPC ............... G01C 21/30; G06K 9/00664; G06K 9/00805; G06K 9/6256; G06K 9/00791;
(Continued)

(56) References Cited

U.S. PATENT DOCUMENTS 9,953,236 B1    4/2018  Huang et al.
10,156,848 B1 *  12/2018  Konrardy .......... G06Q 30/0284
(Continued)

FOREIGN PATENT DOCUMENTS

DE    102016210534 A1 *  12/2017
JP          6227165 B2 *  11/2017  ............... B60R 1/00
(Continued)

OTHER PUBLICATIONS

Qi, Charles R. et al., "Frustram PointNets for 3D Object Detection from RGB-D Data," IEEE/CVF Conference on Computer Vision and Pattern Recognition, pp. 918-927, Jun. 18, 2018.
(Continued)

*Primary Examiner* — Matthew C Bella
*Assistant Examiner* — Kathleen M Broughton
(74) *Attorney, Agent, or Firm* — Slayden Grubert Beard PLLC (57) ABSTRACT

A method for determining landmarks in an environment of a vehicle is described that comprises capturing of initial environmental data, and determining a least a subset of the initial environmental data. The determined subset is assigned a category from a plurality of different categories. Depending on a landmark type, a category is determined, and landmark detection for the landmark type is carried out restricted to the subset of the determined category. A corresponding system for determining landmarks in an environment of a vehicle is also described.

17 Claims, 2 Drawing Sheets

(51) Int. Cl.
*G06V 20/10* (2022.01)
*G06V 20/58* (2022.01)

(58) Field of Classification Search
CPC .............. G06K 9/6267; G06K 9/00818; G06K 2209/23; G06K 2209/25; G06V 20/10; G06V 20/58; G06V 20/56; G06V 20/582; G06V 10/82; G06V 2201/08; G06V 2201/09

See application file for complete search history.

(56) References Cited

U.S. PATENT DOCUMENTS

| | | | |
|---|---|---|---|
| 2012/0170805 A1* | 7/2012 | Brown | G06K 9/6256 382/103 |
| 2018/0012082 A1* | 1/2018 | Satazoda | G06K 9/6267 |
| 2018/0053102 A1* | 2/2018 | Martinson | G08G 1/09623 |
| 2018/0089505 A1 | 3/2018 | El-khamy et al. | |
| 2018/0272992 A1* | 9/2018 | Gage | G06V 10/82 |
| 2018/0365888 A1* | 12/2018 | Satzoda | G06N 3/0454 |

FOREIGN PATENT DOCUMENTS

| | | | |
|---|---|---|---|
| KR | 1020170065894 A | 6/2017 | ............... G06K 9/62 |
| WO | 2018/104563 A2 | 6/2018 | ............. B01C 21/32 |

OTHER PUBLICATIONS

Liu, Li et al., "Deep Learning for Generic Object Detection: A Survey," International Journal of Computer Vision, vol. 128, 30 pages, Sep. 12, 2018.
German Office Action, Application No. 102018133441.9, 8 pages, dated Oct. 24, 2019.

* cited by examiner

METHOD AND SYSTEM FOR DETERMINING LANDMARKS IN AN ENVIRONMENT OF A VEHICLE

CROSS-REFERENCE TO RELATED APPLICATIONS

This application claims priority to German Patent Application No. DE 10 2018 133 441.9, filed on Dec. 21, 2018 with the German Patent and Trademark Office. The contents of the aforesaid Patent Application are incorporated herein for all purposes.

TECHNICAL FIELD

The present invention relates to a method for determining landmarks in an environment of a vehicle. It furthermore relates to a system for determining landmarks in an environment of a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles comprise a plurality of driving functions that permit an at least partially automatic execution of determined driving tasks. A basic requirement for this is a precise knowledge of the environment of the vehicle, in particular its position relative to objects that are relevant for controlling. In order to acquire this knowledge, a plurality of different sensors can be used. The evaluation of the data to be processed in this manner also represents a major challenge in known systems, however.

In U.S. Pat. No. 9,953,236 B1, there is a method for semantically segmenting image data. In this case, dense upsampling convolution (DUC) is carried out, and machine learning processes are used.

A method is known from WO 2018/104563 A2 for video-based positioning, wherein semantic segmenting is carried out. Objects are identified and used to detect landmarks. Visual odometry is carried out.

US 2018/0089505 A1 proposes a method for object detection in an image in which probabilities are determined for identifying determined object candidates. False detections are prevented by scaling and determining the threshold values for these probabilities.

SUMMARY

An object of the present invention is to provide a method and a system that allow particularly efficient determination of landmarks.

The object is achieved by a method and a system with the features of the independent claims. Various embodiments of the invention are the discussed in the dependent claims and the following description.

In one exemplary aspect, a method for determining landmarks in an environment of a vehicle is provided, wherein initial environmental data are captured; at least a subset of the initial environmental data are determined; the determined subset is assigned a category from a plurality of different categories; depending on a landmark type, a category is determined; and landmark detection is carried out for the landmark type restricted to the subset of the determined category.

In another exemplary aspect, a system for determining landmarks in an environment of a vehicle is provided, the system comprising a capturing unit for capturing initial environmental data; a segmenting unit for determining at least a subset of the initial environmental data and for assigning a category from a plurality of different categories to the determined subset; and
a computing unit for determining a category depending on a landmark type, and for carrying out landmark detection for the landmark type; wherein the computing unit is configured to carry out landmark detection restricted to the subset of the determined category.

The details of one or more embodiments are set forth in the accompanying drawings and the description below. Other features will be apparent from the description, drawings, and from the claims.

DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the method of the aforementioned type according to a first exemplary aspect, initial environmental data are captured. At least a subset of the initial environmental data is determined, and the determined subset is assigned a category from a plurality of different categories. Depending on a landmark type, a category is determined, and landmark detection is carried out restricted to the subset of the determined category.

Landmark detection is therefore very fast and with optimum exploitation of resources within the vehicle. Furthermore, false detections can be avoided, and the output data for detecting landmarks can be optimized for carrying out the detection. The method furthermore ensures improved maintainability and testability since faulty landmark detections in unsuitable subsets can be avoided.

In contrast to methods known from the prior art, the occurrence of landmarks is not searched for when determining the subset of the initial environmental data; instead, for example, regions can be determined and categorized in which determined landmark types should be searched for, or are not to be expected.

The term "landmarks" as used herein comprises features and/or patterns in an environment that can be identified and that can be assigned at least one local datum. This can for example be characteristic points or objects that are arranged at determined positions in the environment. The landmarks can have a semantic, i.e., they can also be identifiable per se to human perception as identifiable objects or features. Furthermore, landmarks are also included that do not have any semantics but for example represent abstract patterns that are detectable by pattern recognition.

Landmark types can be assigned to the landmarks in a manner known per se, in particular using geometric properties, or using a semantic that is associated with the landmarks. For example road markers, posts, signs, structures, elements of vegetation or structures of traffic guidance systems can each be defined as determined landmark types. Furthermore, several special landmark types such as "stop signs" and "no parking signs" can be assigned a general or generic landmark type such as "signs". In particular, at least one landmark type can be assigned to each landmark in the method. A specific landmark in this case may also be assigned several special and/or general landmark types.

Landmark types can for example be edges or other parts of structures, markers on a road, traffic guidance apparatuses or two-dimensional codes. For example, lane markers, curve arrows, parking space markers or similar ground markers, posts, poles, pillars, traffic signs or other signs, signal systems or stop lights, building edges or corners, pipes, QR or barcodes as well as alphanumeric displays can be detected. Likewise, additional features can be used for pinpointing that identify characteristic locatable points in a geographic environment of the individual position. In general, these are features that can be identified by means of a pattern recognition method and to which position data can be assigned.

In some embodiments, the initial environmental data are captured by means of a camera. This allows existing installations of the vehicle to be used in order to capture relevant environmental data. The camera captures image data, such as a chronological sequence of individual images that can be combined into video data. The environmental data can furthermore be captured in another way that is known per se, for example by means of vehicle sensors such as optical, radar, lidar, or ultrasonic sensors.

Furthermore, it can be provided in some embodiments that environmental data are captured by an external apparatus and received by an interface. This can for example be a permanently installed sensor for traffic monitoring, for example, that captures and provides environmental data. Furthermore, an external server can be used that receives, saves and if needed provides the relevant environmental data. Such environmental data can for example be captured by specific, or a plurality, of vehicles and installations along a route of travel and transmitted to the server.

A distinction can be made between various types of sensors, wherein a sensor of a specific sensor type captures environmental data according to a determined physical measuring principle. For example, radar sensors are sensors of a first type, and ultrasonic sensors are sensors of another type. Moreover, an additional differentiation can be made, for example a distinction between different types of radar sensors that for example differ from each other in terms of their construction and/or a specific type of data processing.

The environmental data may furthermore be captured in a determined capturing space that can in particular be determined by the sensor type and/or a specific actuation of the sensors. The capturing space may for example be defined by an angle in space as well as a distance or radius relative to the vehicle. Furthermore, several sensors, in particular of a common sensor type, may be used in combination in order to obtain a larger capturing space by combining the captured environmental data. For example, a camera can capture image data at a determined viewing angle, and a combination of several cameras can cover a larger capturing space and for example enable a panoramic view around the vehicle.

In some embodiments, the landmark detection is restricted to a subset of the captured initial environmental data, and the volume of the environmental data to be analyzed is thereby reduced. To accomplish this, a semantic segmentation of the captured initial environmental data may for example be performed in which a classification is performed for subsets of the environmental data, and a category is assigned to them. For example, there is a classification for each pixel of captured image data. In doing so, pixels that are assigned to a common category can be combined into individual subsets or segments, in particular when they form a coherent area.

In some embodiments, the subset is determined by means of a machine learning method. The determination of the subset and if applicable the assignment of a category as well can thus be implemented very flexibly and reliably.

In this case, for example a trained classifier can be used that, using training data, is designed to recognize determined categories using the captured environmental data. Methods from the field of machine learning, or respectively artificial intelligence that are known per se are used, such as a neural network, a deep learning system, or a suitable statistical method.

In some embodiments, the categories comprise one or more of a ground, a road, a vegetation, a developed region, a cultivated region, a pillar, a stationary or driving vehicle, or a person. The categories therefore substantially correspond to object classes. The categories assigned to the subsets are therefore highly suitable to determine suitable subsets of the environmental data in order to detect determined landmark types.

In some embodiments, landmark detection is performed using an heuristic method. Detection may be carried out in a known and reliable manner using given detector modules which comprise a reliably recognizable characterization of the landmarks. In the heuristic method, detection is for example carried out using fixed, given rules for detecting determined features of landmarks of a specific landmark type.

Landmarks of a determined landmark type can be described using a pattern that is suitable to detect a landmark of the determined landmark type in environmental data. The information used for this may for example comprise a mathematically formulated description for recognizing a pattern with which a landmark, or respectively a feature of the environment can be depicted in the signals of a sensor. For example, geometric properties of objects of a landmark type can be described as well as material properties such as reflectance values, or mathematical functions such as gradients of light/dark transitions.

Such descriptions for detecting landmarks of a landmark type are generally sensor-specific so that usefully, independent pattern descriptions for detecting can be provided for the various types of sensors. For example, recognition of patterns in an image from an optical camera differs from recognition within a point cloud that a laser scanner detects. However, generic information suitable for several sensor types can be provided for detection. Furthermore, the data captured by a determined sensor type can be processed so that the same detection method can be used for it as for data from a different sensor type.

Landmarks are detected using environmental data for example using pattern recognition methods by means of which the landmarks can for example be recognized in camera images or laser point clouds. For this, so-called "detector modules" are used. These are for example software modules that may comprise a savable file. The detector modules are designed so that landmarks of a determined landmark type can be detected with their assistance using the captured environmental data. In some embodiments, the detector modules can be specifically designed to detect a determined landmark type. It can be provided that each detected landmark is assigned at least one landmark type.

In some embodiments, in particular when determining the subset, initially a rough classification of regions within the environmental data is performed, in particular using an artificial intelligence method, in which landmarks of a determined landmark type can then be specifically detected, wherein in particular an heuristic method is used for detection. Conversely, other subsets can be excluded for a determined landmark type using the categories assigned to the subsets when detecting the landmarks, for example because an occurrence of a determined landmark type is not anticipated in determined regions of the environmental data. The subset therefore corresponds in particular to a selected region, such as a so-called region of interest (ROI) for the search for landmarks of a determined landmark type. In such image regions, with respect to further processing, it is very important to ascertain them as precisely as possible and to depict the actually relevant regions so that false detections in misidentified regions are also avoided, as well as the mistaken ignoring of incorrectly classified regions. The ROIs may therefore not be defined too small or too large, which is avoided in the method by determining the subset, in particular by means of artificial intelligence.

For example, landmarks of the landmark type "road markers" are anticipated on a road, i.e., in a subset of the environmental data that belongs for example to the category "road". Conversely, landmarks of this landmark type are not anticipated in regions that for example were categorized as a "stationary vehicle". That way, false detections may for example be avoided on the basis of reflections of a landmark.

In doing so, several categories can also be assigned to a subset, for example when one category is included by another category.

In some embodiments, a spatial region in the environment of the vehicle is determined using the determined subset, and other environmental data on surfaces are captured, wherein to capture the other environmental data, another sensor type is used than for capturing the initial environmental data. Landmark detection is furthermore carried out using the other environmental data and depending on the spatial region. This makes it possible to use information obtained by means of the initial environmental data also for environmental data captured by other sensors.

For example, image data are captured as the initial environmental data. Using this image data, first a subset is determined and assigned to a category such that a determined landmark type is detected using this subset. The subset corresponds to a spatial region in the vehicle's environment in which data are captured using other sensors of another sensor type. For example, data from a lidar sensor can be captured there. When evaluating the data from the lidar sensor, in particular in landmark detection for the determined landmark type, filtering can be carried out so that landmark detection is restricted to the same spatial region using the lidar data, or respectively so that other spatial regions can be excluded from landmark detection.

In some embodiments, the other environmental data are only captured in the spatial region, for example by actuating a capturing unit of the other sensor type so that capturing is restricted to the spatial region. The amount of occurring data can thereby be reduced. Consequently, computing periods and latency periods in data transmission are reduced, for example within the vehicle or to an external unit.

The spatial regions may also be saved over a longer period and be used when capturing the other environmental data, for example in other time intervals. For example, a capturing region of a sensor or the region relevant for detecting a determined landmark type can be saved by a sensor controller and used for filtering the captured data.

In some embodiments, the subset is transmitted by a mobile unit, in particular by the vehicle, to an external unit, and landmark detection is carried out by the external unit. The external unit may for example be an external server or a backend apparatus that is coupled to the mobile unit by a data link. Consequently, landmark detection can be carried out by a unit that has greater resources than the mobile unit.

This way, the method of the present aspect enables a significant reduction of the data to be transmitted since only the subset of an appropriate category has to be transmitted for landmark detection. Especially with data transmission via radio waves, the available bandwidth can be used particularly efficiently. The external unit may furthermore have continuously updated detectors for different landmark types and thus for example can also permit detection of such landmarks for which involved software updating would otherwise have to be carried out in the mobile unit.

In some embodiments, request data are generated by the external unit, and the subset is transmitted to the external unit depending on the request data. The external unit can thereby specifically request the required data.

The requested data may for example comprise information on a category with which the subset to be transmitted is formed. In this case, the external unit can first define a determined landmark type for which landmark detection is to be carried out, and the environmental data suitable for this can be requested from the mobile unit using the request data.

In some embodiments, position data for landmarks of the landmark type may be determined and output during landmark detection. Using the position data, a posture of the vehicle is determined. Determining such a posture is for example a prerequisite for carrying out partial or fully automated vehicle driving.

This way, the detected landmarks are assigned position data, wherein for example a position or posture in a coordinate system is assigned to the landmark. This may occur in the detection step or in a separate step. In doing so, the position or posture can for example be determined depending on the assigned landmark type in that for example determined axes are defined for determined landmark types to determine the location of the landmark, or in that determined sections of a landmark serve to determine the position of the landmark. In doing so, a global or relative coordinate system can be used, for example a relative system relative to a capturing unit or a vehicle.

In addition to the position data, other features may be determined in some embodiments for the detected landmarks such as their size and shape, color, a parameter for describing dynamic features, or the evaluation of lettering.

The posture of the vehicle comprises information on its position and orientation in a determined coordinate system, for example a global coordinate system or a relative coordinate system.

To determine the posture, initially the landmarks are captured by the vehicle, and their positions are determined relative to the vehicle. Furthermore, map data are captured that also comprise position data for the landmarks, i.e., information on their location in a coordinate system. It can be a global or relative coordinate system. The position data relate in particular to postures of the landmarks, i.e., describe a combination of their position and their location, for example using their orientation relative to other landmarks. For example, an arrow can point in a determined direction in space, a post can have a determined length and run at a determined angle relative to a road, or an edge of a structure can be at a determined location relative to a road.

A transformation may in some embodiments be determined with which the positions of the landmarks in the vehicle system can be transformed into the coordinate system of the map data. This transformation yields the position, and in particular the orientation of the vehicle in the coordinate system of the map data as well.

In some embodiments, landmark detection is performed using a machine learning method. Machine learning in this case is used not just to determine the subset, but also to detect the landmarks. By carrying out landmark detection using the subset of environmental data, machine learning can also be restricted to smaller amounts of data.

In this case as well, different methods that are known per se may be used in some embodiments. By using example data sets, training is performed in which the system automatically learns to recognize determined patterns for individual landmarks. Different than in an heuristic method, no specified systems of rules for recognizing the landmarks are specified in this case; instead, recognition is based on the data sets for training.

The method is however also performed in two stages when both the determination of the subset as well as landmark detection are performed using a machine learning method: Initially segmentation of the environmental data is carried out, associated with the assignment of categories to subsets of the environmental data.

Then landmark detection is carried out, wherein only those subsets are taken into consideration that were each assigned suitable categories for the landmark types to be detected.

In some embodiments, training data are generated using the subset and, by using the training data, landmark detection training is carried out using the machine learning method. Training can therefore occur in a highly targeted manner.

Training can for example be carried out by an external unit that performs landmark detection. Categorizing the subsets of the environmental data makes it easier to provide relevant training data. This can further improve the automatic detection of the landmarks.

Furthermore, detector modules for landmarks of a determined landmark type may be generated or updated using the training data. Landmark detection can then again occur in a manner different than a machine learning method, in particular using an heuristic method. The detector modules may, e.g., be completely regenerated by machine learning, such as in order to be able to detect new landmark types, or an improved detector module can be generated.

A sliding window method can be used for landmark detection in which a "window" is used to screen the environmental data for detecting the landmarks. The size and possibly the shape as well of such a window must be configured so that the landmarks to be detected can be found therein.

In another exemplary aspect, a system of the aforementioned type comprises a capturing unit for capturing initial environmental data, and a segmenting unit for determining at least a subset of the initial environmental data and for assigning a category from a plurality of different categories to the determined subset. The system furthermore comprises a computing unit for determining a category depending on a landmark type, and for carrying out landmark detection for the landmark type. In doing so, the computing unit is configured to carry out landmark detection restricted to the subset of the determined category.

This system is designed in some embodiments to implement the method as described above, i.e., according to the first aspect or one or more embodiments thereof.

In some embodiments of this system, the capturing unit comprises a camera. Alternatively or in addition and in some embodiments, other sensor types may be provided, for example based on radar, lidar, ultrasound or various optical sensors such as infrared, time-of-flight or stereo cameras. This allows already prepared sensor systems to be used by vehicles.

In some embodiments, a spatial region is determined using the determined subset, and filtering of the environmental data captured by the capturing unit is carried out. In doing so, it is for example determined which subsets of environmental data that were captured by other sensor types correspond to the determined spatial region for the subset. For example, a spatial region is determined using image data for which a lidar sensor also captures environmental data. In order to be able to better detect landmarks in the spatial region, the environmental data of the other sensor type can also be filtered so that the environmental data captured there can be used for landmark detection. Environmental data captured in other regions can in contrast be discarded.

In some embodiments, a controller actuates the segmenting unit so that only the subset of the captured environmental data is transmitted to the computing unit. For example, several subsets that are determined for a landmark type using the categories assigned to them are transmitted to the computer unit. Beneficially, the bandwidth available in the vehicle can accordingly be used very efficiently for transmitting the environmental data. In some embodiments, the controller comprises the segmenting apparatus and carries out the determination of the subset on the level of capturing and the sensors used therefor.

In some embodiments, the system furthermore comprises an interface with an external unit, and the system is configured to transmit the determined subset to the external unit, wherein the external unit is configured to carry out landmark detection using the subset. In some embodiments, the external unit then transmits information on detected landmarks to the interface. The involved step of landmark detection can hence be carried out by the external unit, for example an external server. Determining a relevant subset of the environmental data contributes to the fact that the least amount of data must be transmitted via the interface so that the available bandwidth can be used very efficiently.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1:
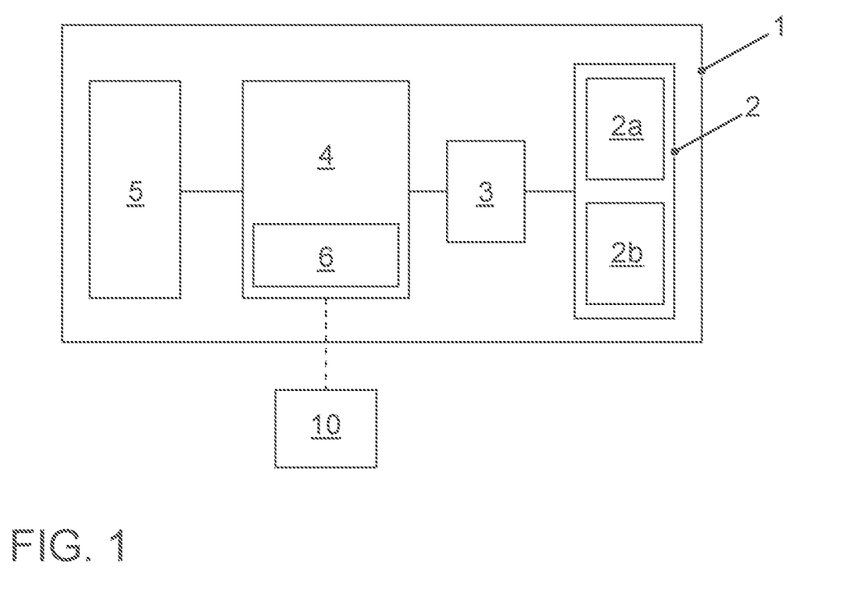
FIG. 1 shows a vehicle with exemplary embodiments of a system for determining landmarks in an environment of a vehicle.

With respect to FIG. 1, exemplary embodiments of a vehicle with a system for determining landmarks in an environment will be discussed.

The vehicle 1 comprises a capturing unit 2 with a camera 2a and a lidar unit 2b. The capturing unit is linked to a segmenting unit 3 that in turn is linked to a computing unit 4. The vehicle 1 moreover comprises a driver assistance system 5 that is also linked to the computing unit 4.

In the present exemplary embodiment, the computing unit also comprises an interface 6 through which a disconnectable, wireless data link can be established with an external unit 10. In the exemplary embodiment, the interface 6 is configured in a manner known per se to establish via a mobile radio network a link with a network, in particular the Internet, via a mobile radio network.

The external unit 10 is configured as a backend server in the example.

In another exemplary embodiment, the segmenting unit 3 is comprised by a controller of the capturing unit 2 and in particular is integrated in the capturing unit 2. Such a controller can furthermore be designed integrally with the camera 2a and/or the lidar unit 2b. In this case, the segmenting unit 3 is designed to carry out comprehensive preprocessing of the captured environmental data before there is any transmission to the computing unit 4.

Figure 2:
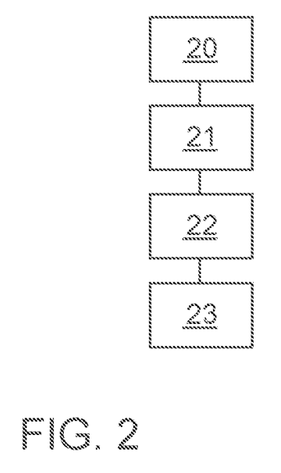
FIG. 2 shows exemplary embodiments a method for determining landmarks in an environment of a vehicle.

Another exemplary embodiment will be explained with reference to FIG. 2. In doing so, the aforementioned exemplary embodiment will be referenced and will be further specified by the description of the method.

In a step 20, initial environmental data are captured by the capturing unit 2. The initial environmental data comprise image data in the exemplary embodiment that are captured by the camera 2a.

The captured initial environmental data are transmitted in a step 21 to the segmenting unit 3. The segmenting unit determines subsets of the initial environmental data using the image data. In the exemplary embodiment, a machine learning method is used for this. Any suitable method from the field of artificial intelligence and neural networks can be used. In the example, a trained classifier is used that was formed using training data to assign the correct categories to the pixels of the environmental data.

In the exemplary embodiment, semantic segmentation was carried out for this. During segmentation, each pixel of the image data is classified and assigned a category. Associated regions of pixels of a common category are termed segments and form a common subset of the environmental data. At least one category is assigned to these subsets.

The assigned categories in the exemplary embodiment relate to properties of different regions in the environment of the vehicle 1 and indicate for example whether a pixel is assigned to a ground, a road, a vegetation, a developed region, a cultivated region, a pillar, a stationary or driving vehicle, or a person. Alternatively or in addition, other categories can be provided.

In the exemplary embodiment, the determined subsets of determined categories are transmitted by the segmenting unit 3 to the computing unit 4. This is in particular an amount of data that is reduced relative to the captured environmental data. This leads to an improved exploitation of the bandwidth available in the vehicle 1 for transmitting data.

The decision on the categories for which the corresponding subsets should be transmitted depends on which landmark types should be determined. It is to be assumed that landmarks of a determined type are found in regions of a determined category. Accordingly for example road markers should be recognized on a road, but not however their mirror images, for example from a reflective surface of a parked vehicle. On the other hand, traffic signs are expected in an edge region next to a street so that the road surface in this case is irrelevant, and a corresponding subset can be excluded from detection.

In other exemplary embodiments, all the captured environmental data are transmitted to the computing unit 4 together with information on the previously determined subsets and their categories. In this case while the computing unit 4 is processing the data, the subsets can be determined that are to be taken into account for landmark types to be detected.

In a step 22, landmarks are determined by the computing unit 4. This is done using those subsets of the environmental data that can be assigned suitable categories for determined landmark types.

To detect the landmarks, detector modules are used that, in the exemplary embodiment, are configured as software modules for detecting landmarks of a determined landmark type using the environmental data. In the exemplary embodiment, heuristic methods are used in which the detector modules comprise a given rule structure for recognizing landmarks of a determined type. In other exemplary embodiments, detection can be carried out using a machine learning method, or a mixture of different methods can be used, for example by employing a machine learning method for generating or updating a detector module.

The following are for example provided as landmark types: Road markers, traffic signs, stop lights, QR codes, posts or other features in the environment of the vehicle 1. When detecting landmarks, their landmark type is determined, and characteristics of the individual landmarks are ascertained, in particular depending on the respective landmark type. In particular, position information relative to the vehicle 1 is relevant in this regard.

In the exemplary embodiment, the landmarks of a determined landmark type are only detected using subsets of the captured environmental data that were assigned a suitable category.

In another step 23, information on the detected landmarks is transmitted to the driver assistance system 5 that, in the exemplary embodiment, carries out landmark-based positioning and uses the information obtained in this manner to autonomously control the vehicle 1. For this, map data are captured that comprise position information and possibly other data on landmarks in the environment of the vehicle 1. A transformation is performed by means of which the position data of the landmarks detected by the vehicle 1 are transferred into the coordinate system of the map data. By using this transformation, the position of the vehicle is also determined, in particular in conjunction with its orientation in the coordinate system of the map data.

In another exemplary embodiment, information on determined relevant categories of the subsets of the environmental data is generated and transmitted to the segmenting unit 3. For example, it is determined which type of landmarks should be detected, and which categories are relevant therefor. Since this information is provided to the segmenting unit 3, the subsets can be specifically determined for determined categories, and the relevant subsets can be specifically transmitted to the computing unit 4. The volume of data to be transmitted can thereby be reduced.

In another exemplary embodiment, additional environmental data are captured by the lidar unit 2b. The information ascertained by the segmenting unit 3 in step 21 is then used in order to very efficiently use this additional environmental data as well. For this purpose, it is determined which spatial regions in the environment of the vehicle correspond to the subsets of the image data that the camera 2a has captured and that were categorized in step 21. For example, the spatial region relative to the vehicle in which the road surface or another vehicle is located is determined using the image data captured by the camera 2a. This spatial region is assigned the same category and then, while the other environmental data that were captured using another sensor type are being evaluated, subsets are then ascertained that correspond to the spatial region. That is, the segmentation, or respectively the determination of subsets, is carried out only using the image data, whereas the subsets captured in the same spatial regions of the other environmental data are assigned the same categories. These subsets are transmitted to the computing unit 4 depending on the categories assigned to them, and are used for landmark detection.

In another exemplary embodiment, the landmarks are at least partially detected by the external unit 10. For this, the environmental data are not completely transmitted via the interface 6 to the external unit 10, also because the bandwidth available for this is typically limited. Instead, only those subsets of the environment data are transmitted that were determined by the segmenting unit 3 and were assigned a suitable category for the desired landmarks.

The external unit 10 can furthermore generate request data that for example comprise information on relevant categories and/or desired landmarks. These request data are received by the vehicle 1 through the interface 6, and the environmental data are captured by the capturing unit 2, and/or the subsets are generated by the segmenting unit 3, so that suitable subsets of determined categories can be provided for the desired landmarks. These suitable subsets are then transmitted to the external unit 10.

The external unit can transmit the determined landmarks, in particular with position information, to the vehicle 1. Alternatively or in addition, the external unit 10 can carry out positioning for the vehicle 1, for example as described above for the driver assistance system 5.

In the other exemplary embodiment, the subsets of the environmental data are used in order to provide training data for a machine learning method, for example to train a classifier. In order to update or generate the classifier, the subsets with suitable categories are used, and the subsets in which landmarks of the desired type exist are initially determined. Then various learning methods that are known per se can be used.

Figure 3:
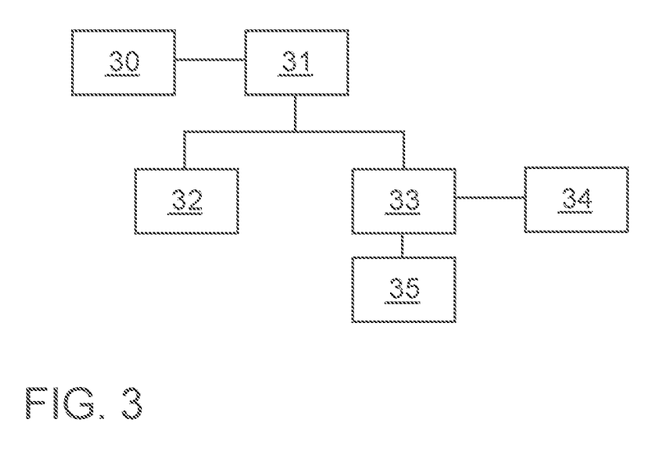
FIG. 3 shows further exemplary embodiments of the method.

Another exemplary embodiment of the method will be explained with reference to FIG. 3. This is largely performed analogous to the exemplary embodiment explained above with reference to FIG. 2. Consequently, those aspects will be explained below in which the method differs from the aforementioned exemplary embodiment.

Image data are captured with the camera 2a in a step 30. The image data are processed in another step 31 by means of semantic segmenting. In the exemplary embodiment, an artificial intelligence method is used, and a trained classifier assigns a category to each of the pixels of the image data.

The segmented image data are then supplied for further image processing in a step 32, or serve to filter sensor data in a step 33.

While the sensor data are being filtered, subsets of the captured environmental data are generated. That way, not only image data captured in step 30 are used, but also other environmental data that are captured in a step 34 for example by a radar or lidar sensor. For filtering, spatial regions in the environment of the vehicle 1 are determined using the segmented image data, and the categories assigned to the segments are also assigned to those data that are captured by other sensors within the same spatial regions. In this manner, for example, subsets of the captured radar or lidar data are determined that were captured within the region of a road or another vehicle.

During filtering in step 33, filtered sensor data are generated that only comprise such subsets that are assigned to determined categories. The filtered sensor data are therefore very suitable in particular for detecting determined landmark types, for example if, in a determined driving situation, only determined types of landmarks are detected. Accordingly, for example while automatically parking the vehicle 1, especially parking space markers on a ground surface are relevant as landmarks.

In another step 35, the sensor data are processed further, wherein in particular landmark detection is carried out. During landmark detection, in particular positions of individual landmarks can be determined in the environment of the vehicle 1 and used to determine the position or posture of the vehicle 1. Moreover, a support function can be carried out, such as a parking garage pilot or park assist.

In another exemplary embodiment, the lidar unit 2b, or respectively any other sensor unit, specifically captures the other environmental data in determined spatial regions that are assigned determined categories and that are to be used for landmark detection. The sensor unit can in this case be actuated for example by a controller so that the capturing space assigned thereto is adapted corresponding to the spatial regions.

LIST OF REFERENCE NUMERALS

1 Mobile unit; vehicle
2 Capturing unit
2a Camera
2b Other sensor type; lidar unit
3 Segmenting unit
4 Computing unit
5 Driver assistance system
6 Interface
10 External unit
20 Capturing environmental data
21 Determination of subsets
22 Determination of landmarks
23 Positioning
30 Capturing of image data
31 Semantic segmentation
32 Image processing
33 Filtering of sensor data
34 Capturing additional environmental data
35 Further processing of the sensor data The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does

What is claimed is:

1. A method for determining landmarks in an environment of a vehicle, comprising:
   capturing initial environmental data using one or more first sensors, which first sensors comprise at least one camera, so that the initial environmental data comprise image data;
   selecting a landmark type based on a category from a plurality of different categories;
   determining at least a subset of the initial environmental data by semantic segmentation based on the selected landmark type, which subset defines a spatial region of interest in the environment of the vehicle in which the landmark type can be expected;
   capturing other environmental data using one or more second sensors, wherein the one or more second sensors are of a sensor type that differs from a sensor type of the one or more first sensors;
   carrying out landmark detection for the landmark type in the other environmental data, which landmark detection is restricted to the determined region of interest in the environment of the vehicle in with the landmark type can be expected, thereby restricting an amount of the other environmental data to be analyzed using the determined subset of the initial environmental data, obtained by semantic segmentation.

2. The method of claim 1, wherein the subset is determined using a machine learning method.

3. The method of claim 2, wherein the categories comprise a ground, a road, a vegetation, a developed region, a pillar, a stationary or driving vehicle, or a person.

4. The method of claim 1, wherein the categories comprise a ground, a road, a vegetation, a developed region, a pillar, a stationary or driving vehicle, or a person.

5. The method of claim 1, wherein landmark detection is carried out using a heuristic method.

6. The method of claim 1, further comprising transmitting the subset by a mobile unit to an external unit; and
   carrying out landmark detection out by the external unit.

7. The method of claim 6, further comprising generating request data by the external unit; and
   transmitting the subset to the external unit depending on the request data.

8. The method of claim 1, further comprising
   determining position data for landmarks of the landmark type using a position sensor and output during landmark detection; and
   using the position data, determining a posture of the vehicle.

9. The method of claim 1, wherein landmark detection is carried out using a machine learning method.

10. The method of claim 9, further comprising
    generating training data using the subset; and
    by using the training data, carrying out landmark detection training out using the machine learning method.

11. The method of claim 1, wherein the subset is determined using a machine learning method.

12. The method of claim 1, wherein the categories comprise a ground, a road, a vegetation, a developed region, a pillar, a stationary or driving vehicle, or a person.

13. A system for determining landmarks in an environment of a vehicle, comprising:
    one or more first sensors, which comprise at least one camera to provide image data;
    one or more second sensors, wherein the one or more second sensors are of a sensor type that differs from a sensor type of the one or more first sensors;
    a capturing unit, connected to the one or more first sensors for capturing initial environmental data and to the one or more second sensors for capturing other environmental data;
    a computing unit, configured to select a landmark type based on a common category from a plurality of different categories;
    a segmenting unit, connected at least with the capturing unit and the computing unit, for determining at least a subset of the initial environmental data by semantic segmentation based on the selected landmark type, which subset defines a spatial region of interest in the environment of the vehicle; wherein
      the computing unit is further configured to, after the subset has been determined, carry out landmark detection for the landmark type in the other environmental data, which landmark detection is restricted to the determined region of interest in the environment of the vehicle in with the landmark type can be expected, thereby restricting an amount of the initial environmental data to be analyzed using the determined subset of the initial environmental data, obtained by semantic segmentation.

14. The system of claim 13, wherein a controller actuates the segmenting unit so that only the subset of the captured environmental data is transmitted to the computing unit.

15. The system of claim 13, further comprising
    an interface with an external unit; wherein
    the system is configured to transmit the determined subset to the external unit; wherein
    the external unit is configured to carry out landmark detection using the subset.

16. The system of claim 13, wherein a controller actuates the segmenting unit so that only the subset of the captured environmental data is transmitted to the computing unit.

17. The system of claim 13, further comprising
    an interface with an external unit; wherein
    the system is configured to transmit the determined subset to the external unit; wherein
    the external unit is configured to carry out landmark detection using the subset.

* * * * *